United States Patent [19]
Cho

[11] Patent Number: 6,093,097
[45] Date of Patent: Jul. 25, 2000

[54] METHODS AND APPARATUS FOR CONTROLLING AN AIR INLET CLOSURE OF AN AIR CONDITIONER

[75] Inventor: Jae-Seok Cho, Suwon, Rep. of Korea

[73] Assignee: Samsung Electronics Co., Ltd., Suwon, Rep. of Korea

[21] Appl. No.: 09/187,342

[22] Filed: Nov. 6, 1998

[30] Foreign Application Priority Data

Nov. 7, 1997 [KR] Rep. of Korea ................ 97-58787

[51] Int. Cl.⁷ ................................................ F24F 1/00
[52] U.S. Cl. ................................ 454/233; 454/234
[58] Field of Search ........................... 454/234, 235,
454/351, 352, 347; 219/472, 475, 552;
96/62, 63, 64

[56] References Cited

U.S. PATENT DOCUMENTS

| | | | |
|---|---|---|---|
| 4,135,487 | 1/1979 | Hays | 126/110 R |
| 5,322,473 | 6/1994 | Hofstra et al. | 454/186 |
| 5,372,189 | 12/1994 | tsunekawa et al. | 62/262 |

*Primary Examiner*—Harold Joyce
*Assistant Examiner*—Derek S. Boles
*Attorney, Agent, or Firm*—Burns, Doane, Swecker & Mathis, L.L.P.

[57] ABSTRACT

An air conditioner includes an air inlet and an air outlet, an electric dust collector for removing dust from the air, a refrigerant-conducting heat exchanger for changing a temperature of the air, a fan for circulating air through the air conditioner, and an electrical heater which is energized when the fan and the electrical dust collector are energized, for heating the cleaned air. The electric dust collector communicates with only a lower portion of the air inlet. A closure mechanism for opening and closing the air inlet is operable to open only the lower portion of the inlet to insure that all of the air entering the air conditioner passes through the electrical dust collector during an air cleaning operation.

6 Claims, 12 Drawing Sheets

METHODS AND APPARATUS FOR CONTROLLING AN AIR INLET CLOSURE OF AN AIR CONDITIONER

BACKGROUND OF THE INVENTION

1. Field of the Invention

The present invention relates to an air conditioner with an auxiliary electrical heater for discharging warm air and a electrical dust collector for purifying room air.

2. Description of the Prior Art

A general air conditioner includes a heating apparatus for supplying warm air by heating cold room air and a cooling apparatus for supplying cold air by cooling warm room air. Besides, a heating and cooling apparatus of an the air conditioner is also marketed for a dual function of heating and cooling operations including an air purifying function for cleaning the polluted room air.

Figure 1:
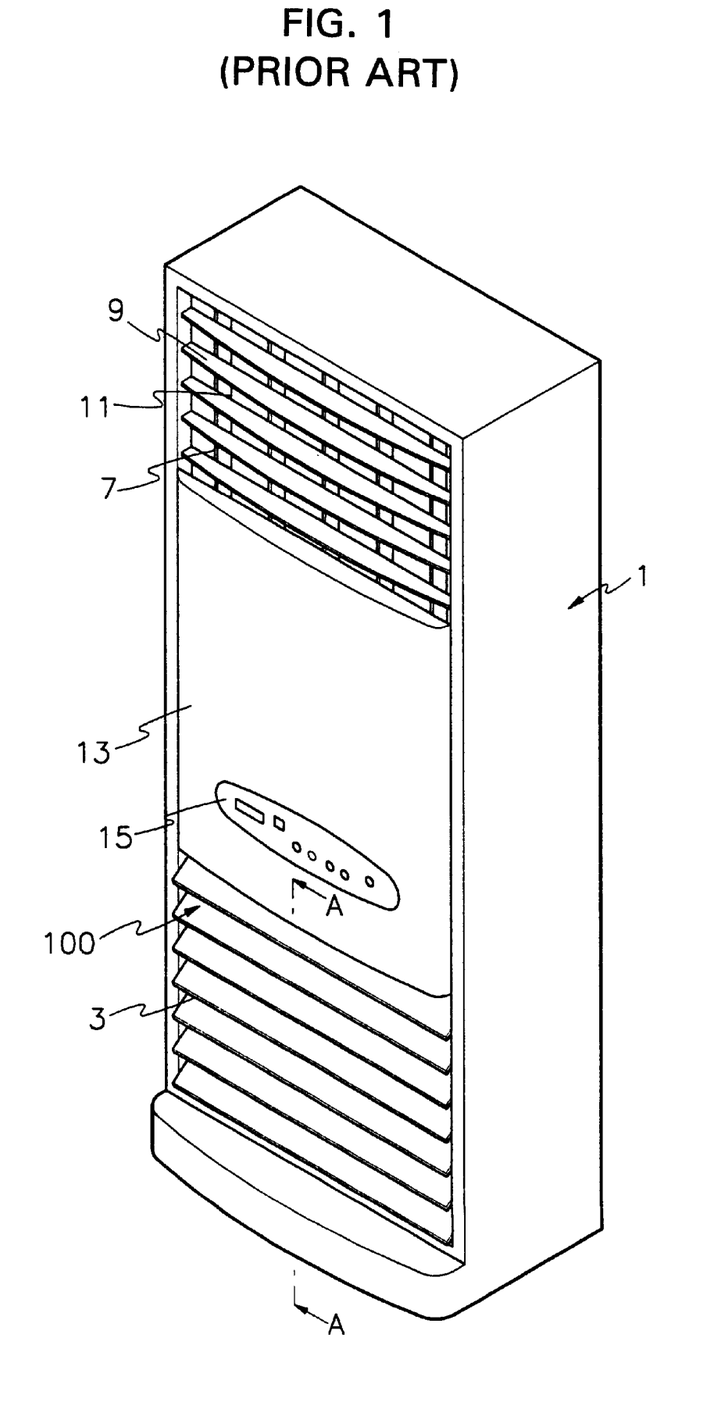
FIG. 1 is a front perspective view of a conventional air conditioner.

FIGS. 1–5B illustrate an indoor unit of a conventional heating and cooling apparatus (generally referred to as an air conditioner). As shown in FIG. 1, the indoor unit (1) is provided with a suction inlet (3) at a lower front portion thereof to admit room air and with a discharge outlet (7) at an upper front portion thereof to discharge the heat-exchanged air, i.e., the heated or cooled air, that is sucked through the suction inlet (3).

Furthermore, disposed across the discharge outlet (7) are horizontal vanes (9) and vertical vanes (11) for respectively controlling the vertical and horizontal directions of the air discharged indoors therethrough. A cover member (13) is attached for forming an external appearance of the indoor unit (1) and for protecting interior arts at the indoor unit (1). An operating part (control panel) (15) is also disposed at a lower portion of the cover member (13) for controlling overall operational modes (auto, cooling, dehumidifying, blowing, heating, etc.) of the air conditioner, for starting or stopping an operation thereof and setting the amount and direction of the air discharged through the discharge outlet (7).

Suction inlet opening, and closing means (100) is provided to open the suction inlet (3) for readily sucking room air therethrough while the air conditioner is in operation, and to close the suction inlet (3) for preventing dust, foreign material and the like from being induced and for having a better appearance while the air conditioner is maintained at an operation stand-by state.

Figure 2:
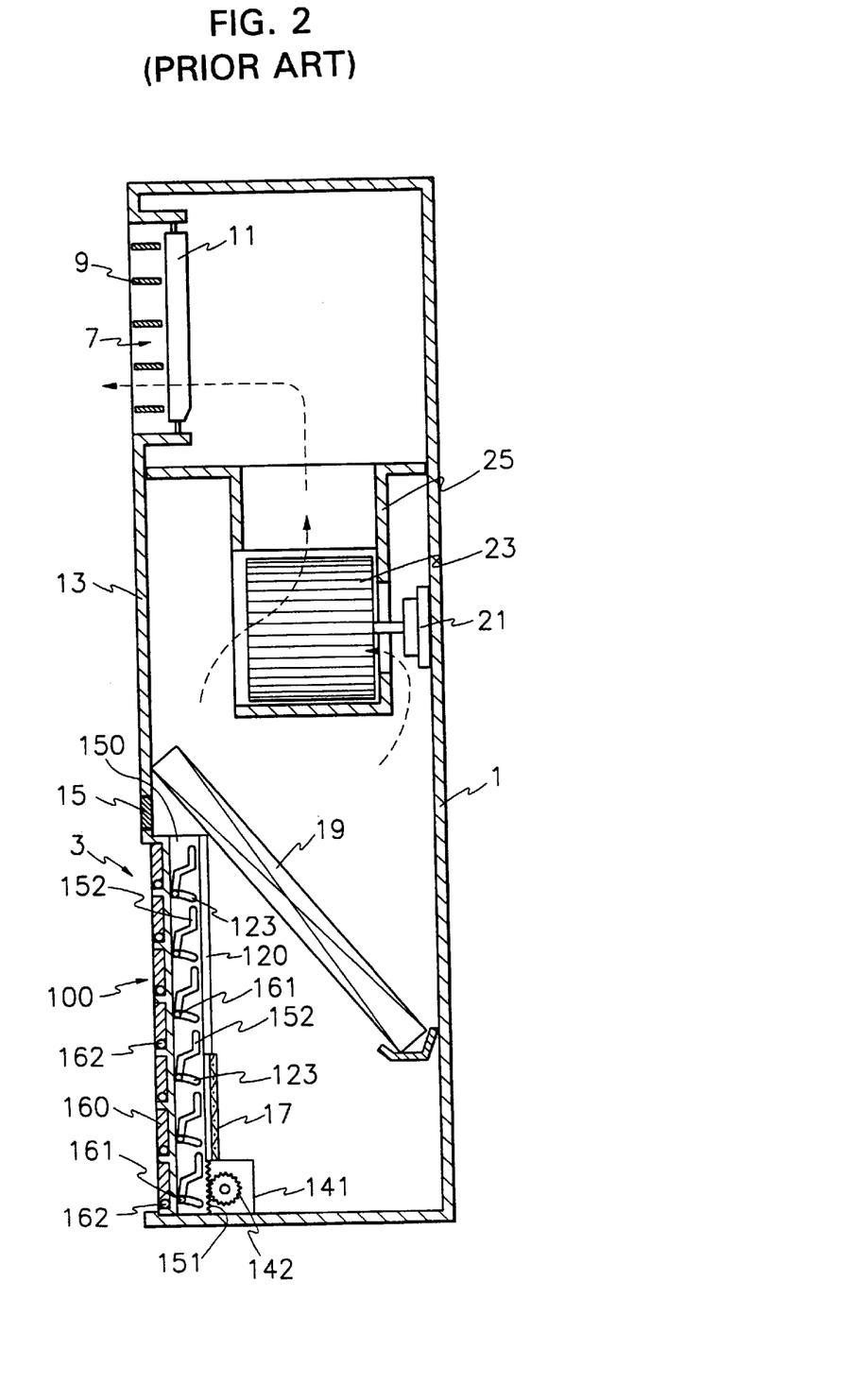
FIG. 2 is a vertical sectional view of the conventional air conditioner of FIG. 1.

As shown in FIG. 2, there is provided an electrical dust collector (17) disposed at an inner lower side of the suction inlet opening and closing means (100), the dust collector (17) being integrated with an electrifying part for breaking down and ionizing dust particles of the room air by using high voltage and a dust collecting part for attracting the ionized dust particles onto a dust collecting plate of an opposite electric charge. Also, odors are removed from the air.

In addition, a refrigerant-conducting indoor heat-exchanger (19) is disposed downstream of the electric dust collector (17) for heat-exchanging into cold or warm air the room air sucked through the suction inlet (3) by way of evaporative latent heat of the coolant. An indoor fan 23 is disposed over the heat-exchanger (19) and is rotated by an indoor fan motor (21) for sucking the room air through the suction inlet (3) and for discharging through the discharge outlet (7) the air heat-exchanged at the heat-exchanger (19). A duct member (25) encompasses the indoor fan (23) for guiding the flow of the air sucked through the suction inlet (3) and discharged through the discharge outlet (7).

Figure 3:
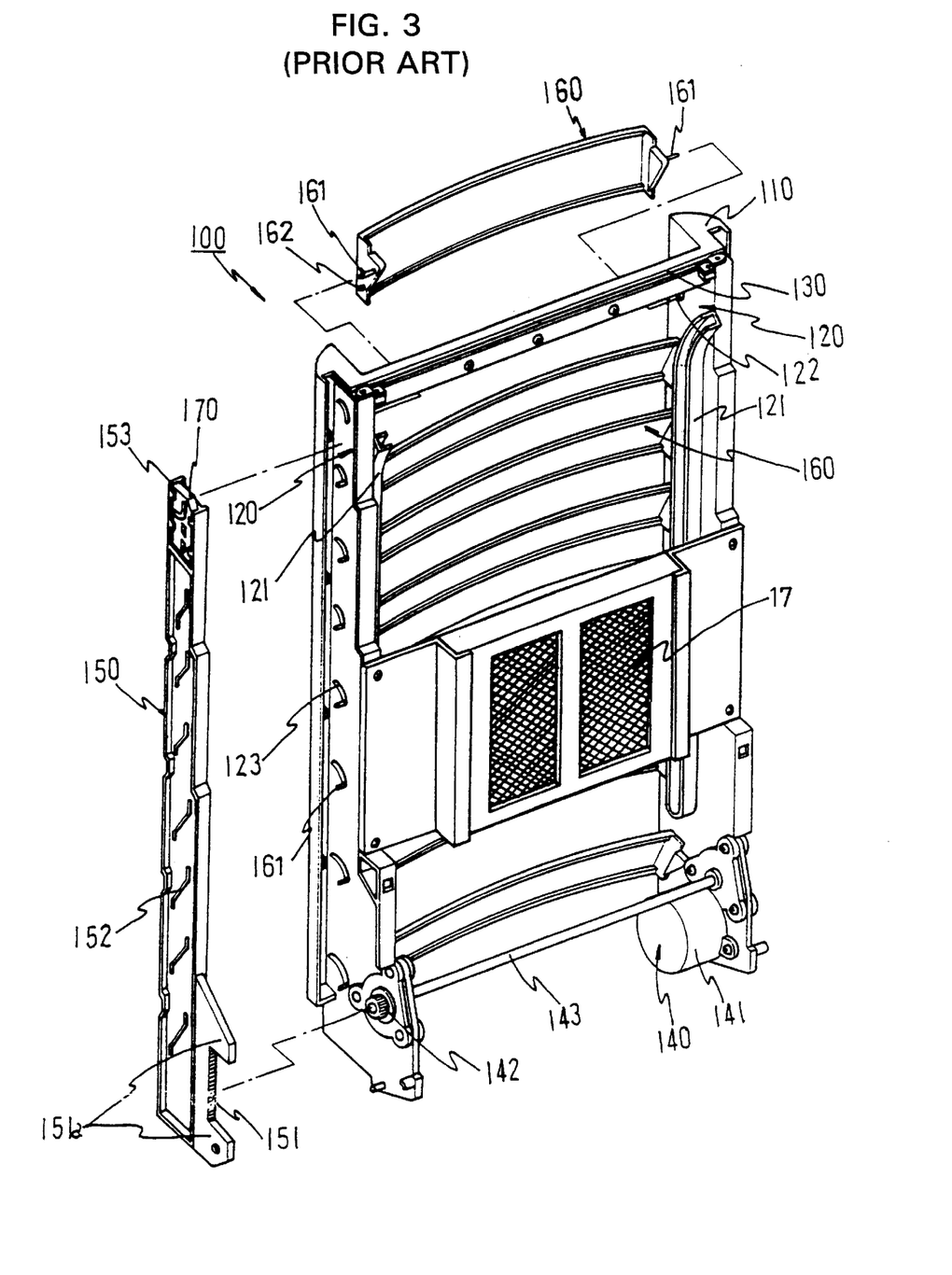
FIG. 3 is an exploded rear perspective view of an air inlet opening and closing mechanism and an electrical dust collector in accordance with the conventional air conditioner.
Figure 4:
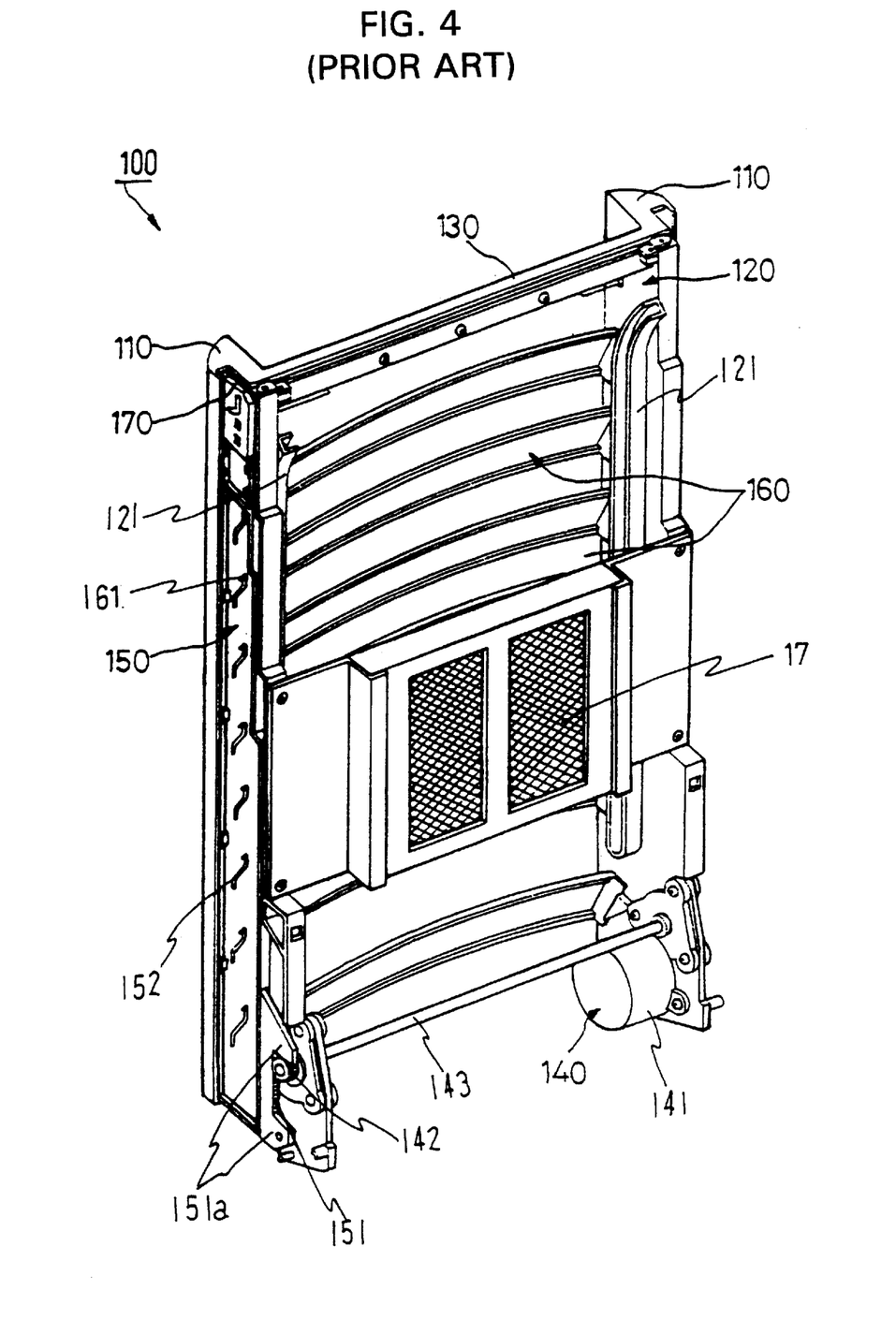
FIG. 4 is a view similar to FIG. 3 with the parts thereof assembled.

As shown in FIGS. 3 and 4, the suction inlet opening and closing means (100) includes a pair of grille vertical side frames (110) designed for easy attachment and detachment, a pair of guide members (120) at inner sides of respective grille side frames (110), a horizontal frame member (130) interconnecting upper ends of the grille side frames (110) for maintaining a gap therebetween, driving means (140) disposed between the lower ends of the guide members (120) for maintaining the gap between the guide members (120) and for being driven by the supply of power, a pair of slider members (150) at external sides of respective guide members (120) for being raised or lowered with respect to the guide members (120) by the driving means (140), a plurality of suction grilles (160) hinged to inner sides of respective guide members (120) for being vertically rotated about horizontal axis to open or close the suction inlet (3) in response to the rising or lowering of the slider member (150), and a plurality of auxiliary slider members (170) vertically movable with respect to the slider members (150) against a spring bias.

The guide members (120) include at the inner rear ends thereof a pair of vertical filter guide rails (121) for permitting a filtering member (19) to be installed. A plurality of circular hinge holes (122) are formed in the guide members (120) to rotatably mount hinge axles (162) disposed at both ends of the suction grilles (160). A plurality of guide slots (123) are formed in the guide members (120) for slidably receiving pins 161 of the suction grilles (160) to guide a rotary movement of the grilles (160) and setting an effective stroke distance therefor.

Furthermore, the driving means (140) includes a motor (141) disposed at an inner bottom side of one of the guide members (120) and a rotary shaft (143) installed between the lower ends of the guide members (120) for transmission of the driving force of the motor (141) to pinions (142) mounted on respective guide members (120). The pinions (142) are fixed at respective ends of the rotary shaft (143).

Each slider member (150) comprises: a lower toothed rack (151) to change rotating movement of the pinion (142) into rectilinear movement of the slider member. A plurality of drive slots (152) are formed in the slider members (150) at predetermined vertical intervals correspondingly to the guide slots (123). The pins (161) of the grilles (160) extend into respective drive slots (152) and are displaced thereby to rotate the grilles. A guide part (153) is formed at an upper external side of each slider member to enable the auxiliary slider member (170) to ascend higher than the upper end of the slider member (150) by way of a spring bias or to descend as low as the upper end of the slider member (150) by a spring compression.

Furthermore, hitching jaws (151a) protrude from both ends of each rack (151) to prohibit the respective pinion (142) from breaking away when the slider member (150) is making a vertical rectilinear movement.

Each suction grilles (160) includes a pair of the axles (162) protruding from opposite ends thereof to be rotatably mounted in the hinge holes (122) formed in the guide members (120) and a pair of the pins (161) which are inserted into the slots (152) of the slider members (150) after passing through the guide slots (123) of the guide members (120). The axles (162) are shorter than the pins (161) to facilitate the operation of the slider members (150).

Figure 5A:
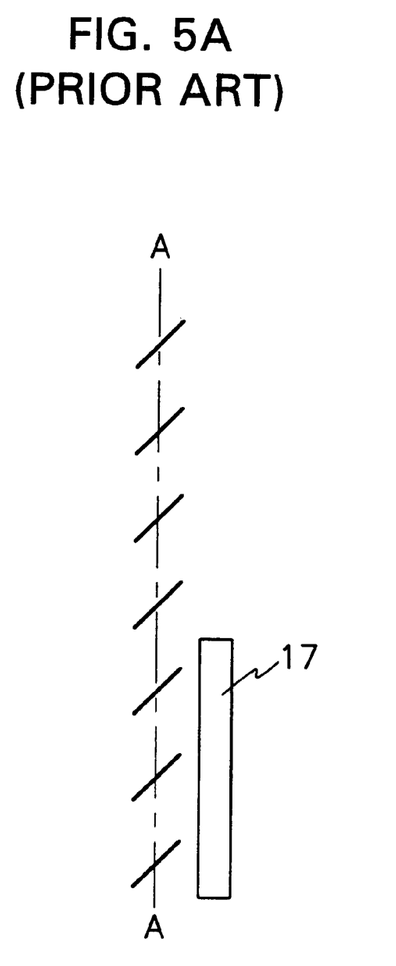
FIGS. 5A and 5B schematically illustrate, respectively, the open and closed states of inlet closure grilles, taken along line A—A in FIG. 1.

In the air conditioner having dual functions of heating and cooling operations, one of the pinions (142) is rotated directly by the motor (141) and the other pinion (142) is rotated by the rotary shaft (143) if the proper operation key of the control panel or remote controller is depressed. The pinions (142) lower the slider members (150). When the slider members (150) are lowered, the slots (152) on the slider members (150) are simultaneously moved downwards and pass across the guide slots (123) to displace the pins (161) of the suction grilles (160). Therefore, the suction grilles (160) are rotated about the hinge axles (161) to open the inlet (3) as shown in FIG. 5A. The grilles are caused to reach to their open (or closed) state simultaneously.

At this time, detecting switches (not shown) disposed at predetermined locations are activated to inform of the opening of the inlet (3), whereby the motor (141) stops, and the electric dust collector (17) is actuated. At the same time, the indoor fan motor (21) is driven to rotate the indoor fan (23).

If the indoor fan (23) is driven, the dust floating in the room air is sucked through the suction inlet (3) into the indoor unit (1) where the dust is broken down into minute particles and ionized with a positive electric charge to be attracted to the dust collecting plate (not shown) for disposal. Then, the purified air is guided upwards to be discharged indoors through the discharge outlet (7), thereby completing the air cleaning operation.

If the operation key is turned off during the air cleaning operation, the electrical dust collector (17) and the indoor fan motor (21) are simultaneously stopped. The motor (141) is driven in reverse to raise the slider members (150).

Figure 5B:
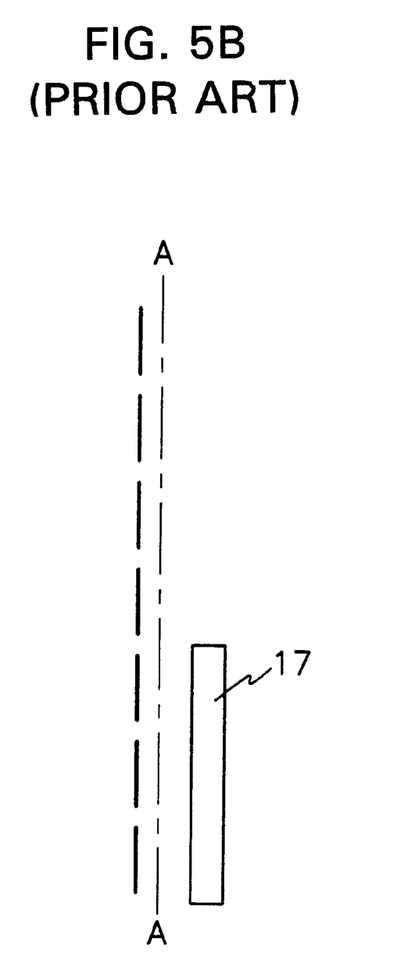

At the same time, the slots (152) of the slider members (150) push upwards the pins (161) of the suction grilles (160) to close the suction inlet (3), as shown in FIG. 5B.

At this time, if a predetermined time (i.e., the experimentally collected data for a time period beginning when the opening detecting switches of the suction inlet are turned on and ending when the suction inlet is closed, about 9.5 seconds) elapses it is concluded that the suction inlet is closed and the motor (141) is stopped, thereby returning to the operation stand-by state of the air conditioner.

If a key is actuated to stop the warm air cleaning operation with the operation key of the air conditioner being kept on, then the electrical dust collector (17) is turned off to return to an operation mode of the air conditioner occurring prior to the initiation of the warm air cleaning operation.

However, there is a problem in the conventional air conditioner in that the electrical dust collector (17) is located behind only a portion of the suction inlet (3) (for example, behind three lower grilles), so that the room air sucked through the suction grilles disposed above the dust collector (17) is not purified, thereby lowering the dust collecting efficiency in the air conditioner. There is another problem in the conventional air conditioner in that, when the air cleaning operation is performed on cold days in winter, cold air is discharged which creates an unpleasant feeling to the user and thereby discourages the user from taking advantage of the air cleaning operation during cold days.

SUMMARY OF THE INVENTION

The present invention is presented to solve the aforementioned problems and it is an object of the present invention to provide a suction inlet control method and apparatus for an air conditioner which prevents cold air from being discharged indoors and which enables all sucked room air to pass through the electrical dust collector to thereby improve the air cleaning efficiency.

One aspect of the invention involves an air conditioner comprising a housing forming an air inlet for admitting air from a room, and an air outlet for discharging the air back into the room. An electrical dust collector is disposed between the air inlet and the air outlet for removing dust from the air. A heat exchanger is disposed between the electrical dust collector and the air outlet for changing a temperature of the air. A fan is provided for sucking air into the air inlet and discharging the air through the air outlet. An electrical heater is disposed between the electrical dust collector and the air outlet for heating the air. A control mechanism is provided for energizing the electrical heater when the fan and the air cleaner are energized, for heating the cleaned air.

In another aspect of the invention, a closure mechanism is provided for opening and closing the air inlet. That mechanism comprises a plurality of vertically adjacent inlet grilles arranged to be moved between open and closed positions. The inlet grilles form respective air openings when in their open positions. The electrical dust collector is arranged to communicate with a first plurality of inlet grilles, and not with a second plurality of inlet grilles. A grille moving mechanism is provided for opening only the grilles associated with the first plurality of inlet grilles when the air cleaner is energized.

Another aspect of the invention relates to a method of operating such an air conditioner wherein the electric heater is energized when the fan and the air cleaner are energized, for heating the cleaned air.

Yet another aspect of the invention relates to a method of operating such an air conditioner wherein only the first plurality of inlet grilles is opened when the air cleaner is energized.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF A PREFERRED EMBODIMENT OF THE INVENTION

A preferred embodiment of the present invention is described in detail with reference to the accompanying drawings. Throughout the drawings, like reference numerals and symbols are used for designation of like or equivalent parts or portions for simplicity of illustration and explanation, and redundant references will be omitted.

Figure 6:
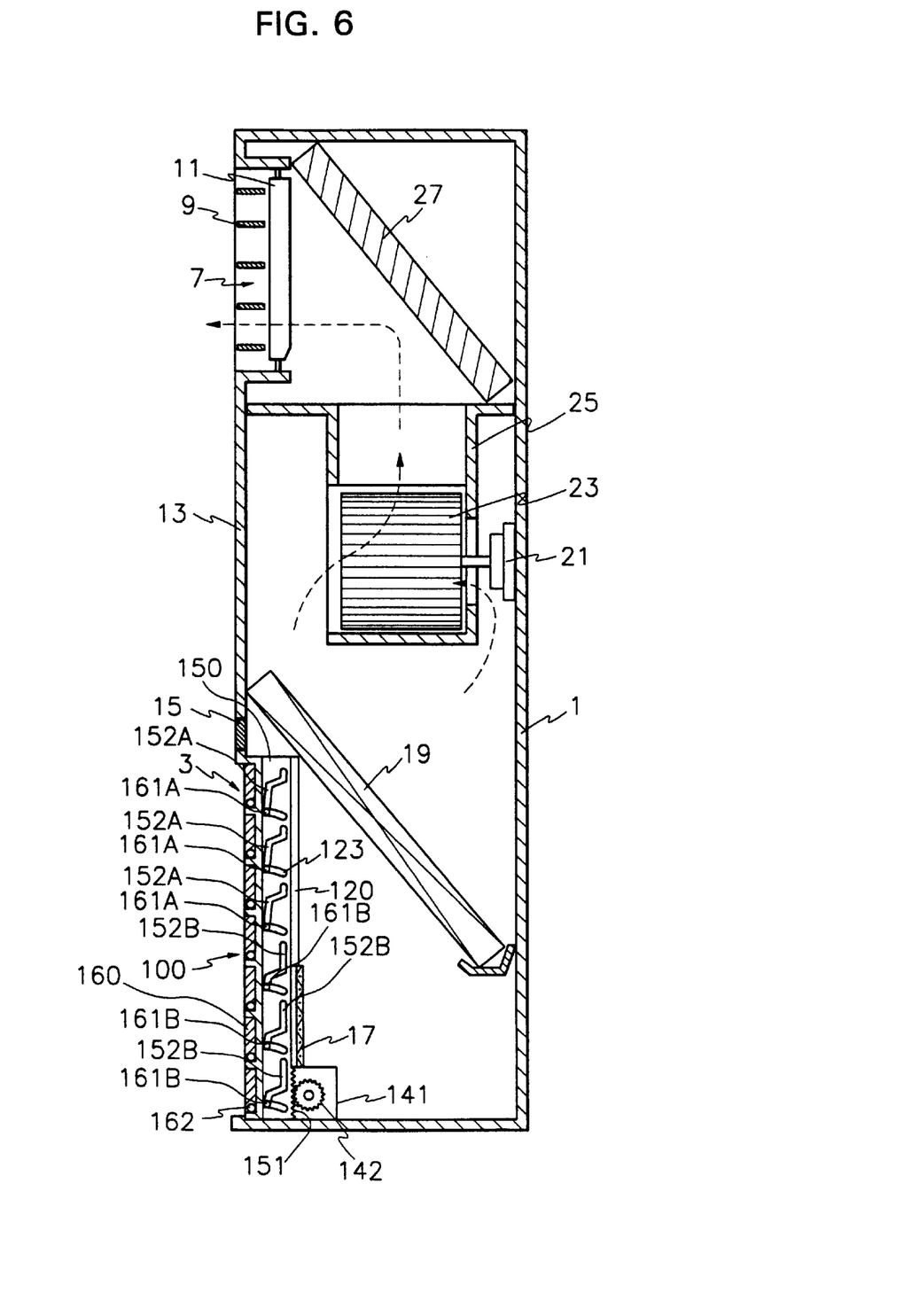
FIG. 6 is a vertical sectional view for illustrating an indoor unit of an air conditioner in accordance with the present invention.

As shown in FIG. 6, an electrical heater (27) is mounted over the indoor fan (23) for heating the room air cleaned by the electrical dust collector (17).

Figure 7:
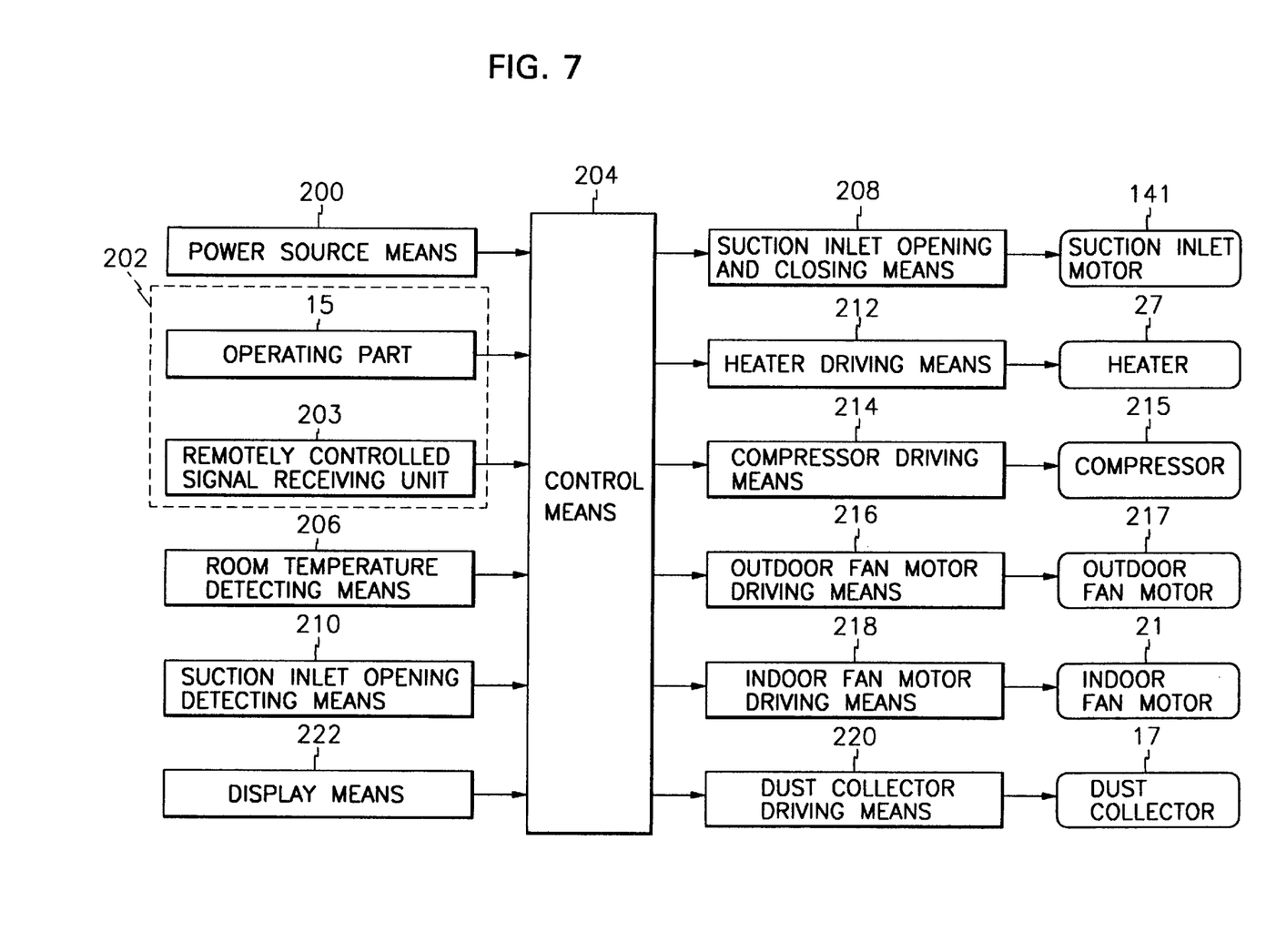
FIG. 7 is a control block diagram for illustrating a suction inlet control apparatus of an air conditioner in accordance with an embodiment of the present invention.
Figure 8A:
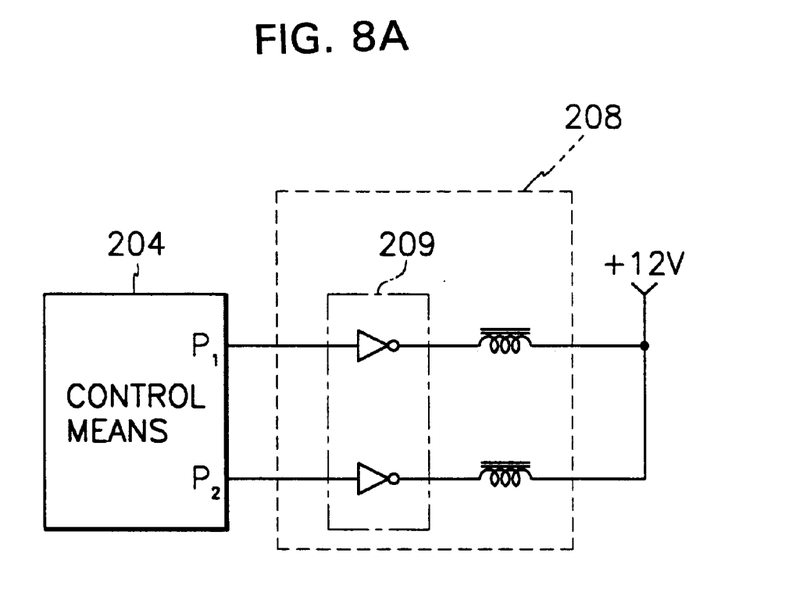
FIGS. 8A and 8B are is a detailed circuit diagrams of suction inlet opening and closing, means in accordance with the present invention.
Figure 8B:
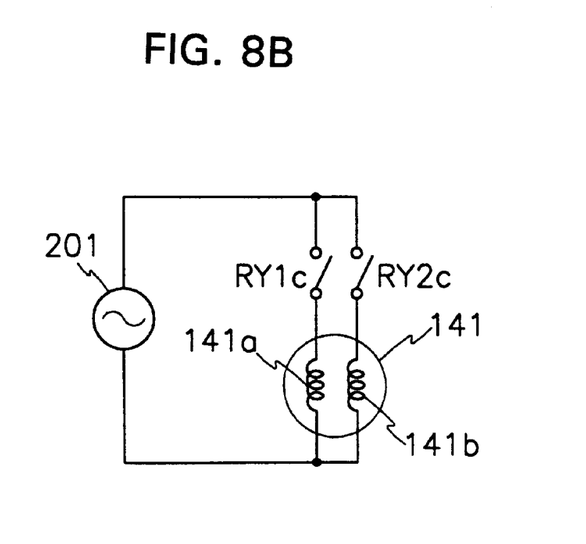

As shown in FIGS. 7 and 8, power source means (200) is applied to convert commercial alternating current voltage supplied from the alternating current power terminal into the predetermined direct current voltage. An operation manipulating means (202) comprises a plurality of selection keys for all operation modes (auto, cooling dehumidifying, blowing, heating and the like), for setting an amount (strong air, weak air, or soft air) of the air discharged through the discharge outlets (7), and a desired room temperature, wherein the operation manipulating means (202) comprises the operation part (15) disposed at the control panel of the indoor unit (1) and a remotely controlled signal receiving part (203) for receiving an ultraviolet signal transmitted from a remote controller (not shown).

A control means (204) is a microcomputer to initialize the operation of the air conditioner by receiving the direct current voltage supplied from the power source means (200) and, additionally, to control overall operation of the air conditioner according to the operation signals from operation manipulating means (202). During the warm air cleaning operation utilizing the electrical heater (27) and the electrical dust collector (17), the control means (204) reduces a suction area of the suction inlet (3) (see FIG. 10B) and counts the time when the motor (141) is driven to control the closure of the suction grilles (160).

Figure 11:
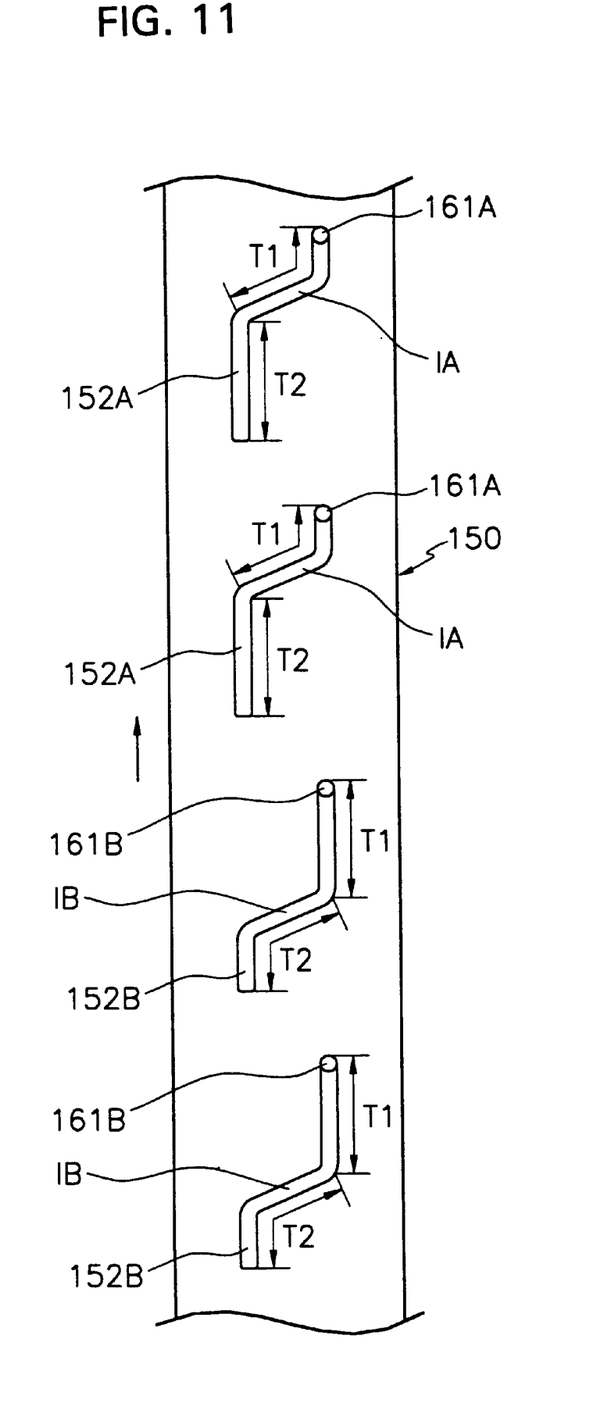
FIG. 11 is a side view of a grille-closing slider member depicting how the grilles are closed according to the invention.

A preferred way of achieving this involves a particular shape and relationship between the slots (152A, B) formed in the slider members (150), as shown in FIG. 11. As in the earlier-described prior art arrangement, the inlet grilles (160) have pins (161) which extend into respective drive slots (152) of the slider members. When the slider members are moved vertically, the pins are acted upon by side edges of the slots so as to be displaced, whereby the grilles are rotated into open or closed positions, depending on whether the slider members are being raised or lowered.

In the prior art the slots (152) are identical so all of the grilles (160) reach their open or closed state simultaneously. However, the slots of the slider members (150) of the present invention are arranged so that it is possible for the grilles (160E, 160F, 160G) located in front of the dust collector (17) to be open, while the remaining grilles (160A–D) are closed, in order to achieve a cleaning of all incoming air.

To achieve this, the slots (152A) associated with the top four grilles (160A–D) are shaped identically, and the slots (152B) associated with the bottom three grilles (160E–G) are also shaped identically to one another, but differently from the top slots (152A). Those shapes result in the top four grilles being rotated to their closed states before the lower three grilles (160E–G) begin to rotate out of their open states. That is, when all of the grilles (160A, 160B) are in an open state, and the slider members (150) are driven upwardly, the pins travel a distance T1. The pins (161A) of the upper grilles (160A–D) thus travel completely across the inclined portions IA of the respective slots. That results in a closing of the upper grilles. However, the pins (161B) of the lower grilles (160E–G) only reach the inlets of the inclined portions IB of their respective slots (152B), so they are still open. Generally, it takes about 5.5 seconds for this to occur, so it is only necessary to operate the motor for 5.5 seconds in order to ensure that only the grilles (160E–G) remain open.

If it should be desired to close all of the grilles then the motor is operated for a longer period, causing the pins (161A, B) to travel distance T2. During that travel, the pins (161A) of the upper grilles (160A–D) merely move within vertical portions of their respective slots and do not rotate, whereas the pins (161B) of the lower grilles (160E–G) traverse the inclined portions IB and are swung closed.

Room temperature detecting means (206) adjusts a room temperature (Tr) to the temperature (Ts) which a user sets by operation of manipulating means (202) in order to carry out the simultaneous operations of sucking and discharging air in the air conditioner by detecting a temperature (Tr) of the room air sucked through the suction inlet (3).

Suction inlet opening and closing means (208) controls the operation of the motor (141) by receiving a control signal sent from the control means (204) and for moving the suction grilles (160) to open and close the suction inlet (3) if an operation signal (start or stop) is supplied by the user operation manipulating means (202). The suction inlet opening and closing driving means (208) comprises an inverter IC(209) to invert a high level of the opening or closing control signal output from the output terminals (P1 and P2) of the control means (204), a relay(RY1) driven by the direct current voltage (12 V) generated from the power source means (200) to enable the suction inlet motor (141) to rotate in a forward direction when a low level of an opening control signal transformed by the inverter IC (309) is output, and another relay (RY2) driven by the direct current voltage (12 V) output from the power source means (200) to rotate the suction inlet motor (141) in a reversed direction when a low level of a closing, control signal is output.

Suction inlet opening detecting means (210) discriminates whether the suction grilles (160) have opened the suction inlet (3) according to the position of the slider members (150) and provides a signal to the control means (204). Heater driving means (212) energizes the electrical heater (27) in response to a control signal from the control means (204) for heating the room air cleaned by the electrical dust collectors (17).

Compressor driving means (214) receives a control signal for driving the compressor (215), the signal generated by the control means (204) according to the difference between the room temperature (Ts) set up with the operation manipulating means (202) and the room temperature(Tr) detected by the room temperature detecting means (206).

Outdoor fan motor driving means (216) controls the revolution frequency of an outdoor fan motor (217) of an outdoor heat exchanger to drive the outdoor fan in response to a control signal which is generated from the control means (204) in accordance with the difference between the preset room temperature(Ts) and the detected room temperature (Tr).

Indoor fan motor driving means (218) controls the revolution frequency of the indoor fan motor (21) to drive the indoor fan (23) in response to a control signal which is generated from the control means (204) in accordance with the difference between the preset room temperature(Ts) and the detected room temperature(Tr), thereby circulating indoor room air through the unit 1.

In addition, dust collector driving means (220) energizes the dust collector (17) for breaking down and ionizing dust particles of the dust contained in the room air sucked through the suction inlet (3) and for collecting the electrically charged dust particles, in response to the control signal sent front the control means (204). Display means (222) receives a control signal generated from the control means (204) in response to a key input signal from the operation manipulating means (202) such as auto, cooling, dehumidifying, blowing, heating, etc., room temperature and the current time.

Figure 9A:
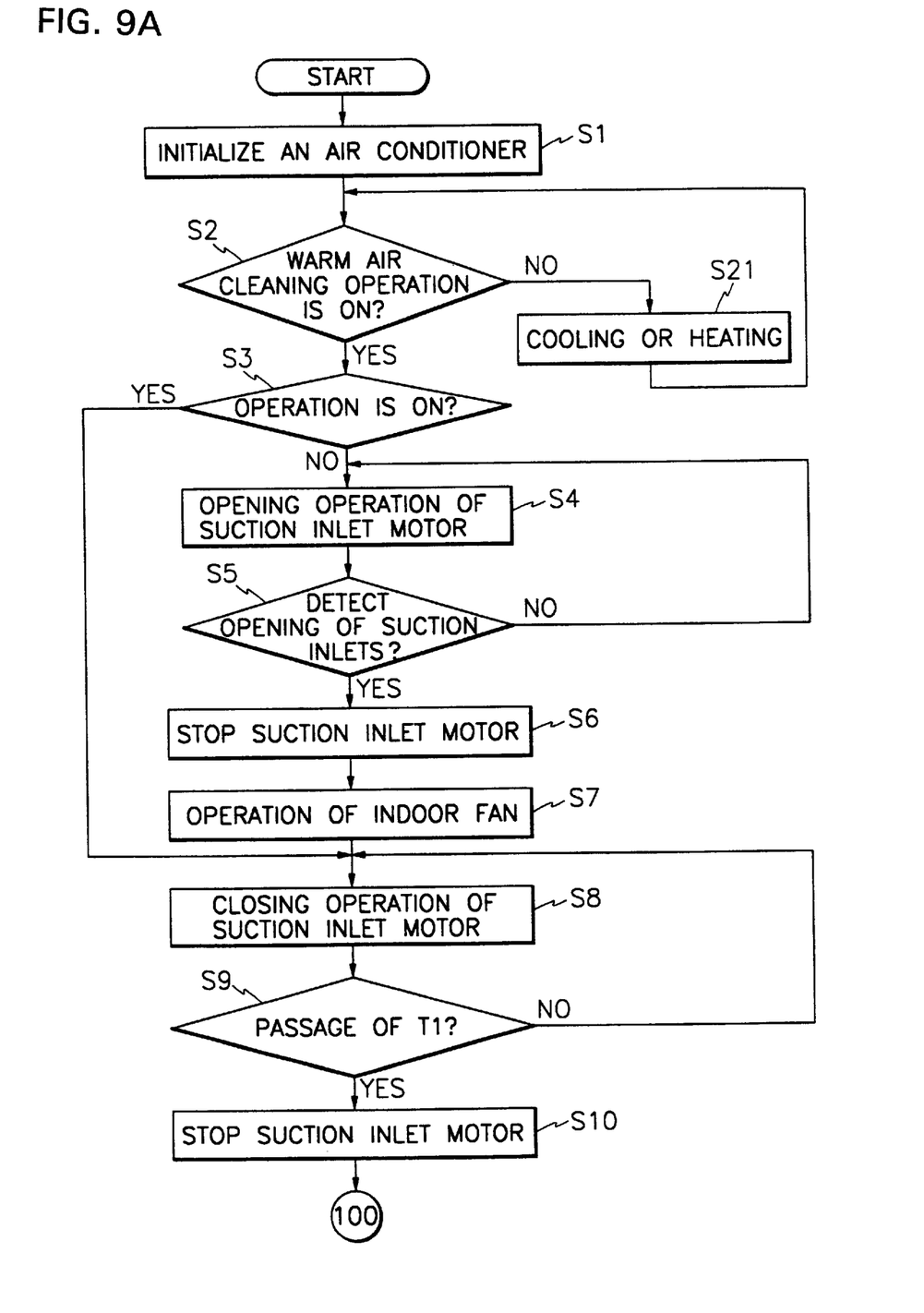
FIGS. 9A and 9B are flowcharts for illustrating operational procedures of a suction inlet control method in accordance with the present invention.
Figure 9B:
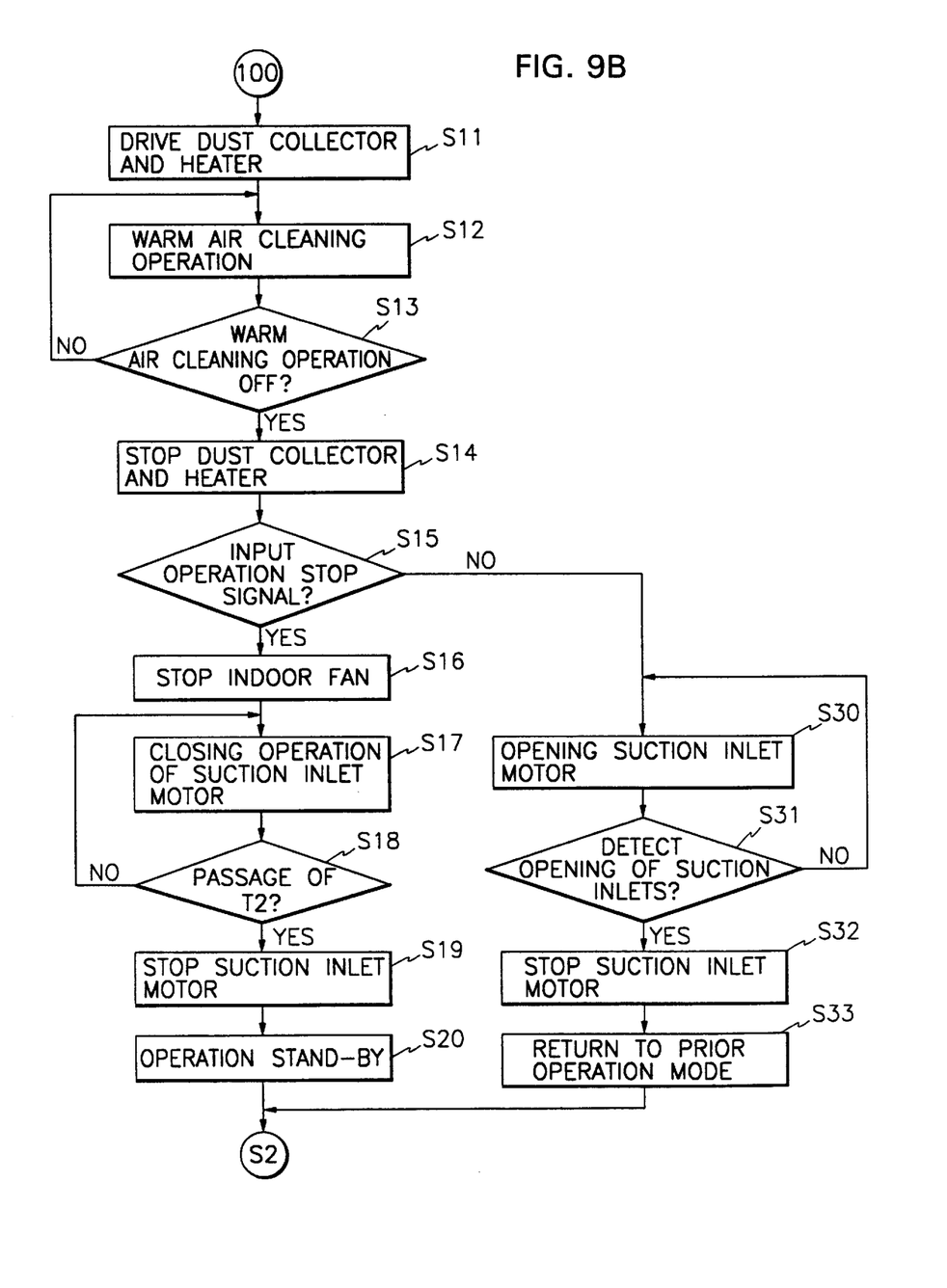

Hereinafter, a suction inlet control apparatus and the method thereof are described. FIGS. 9A and 9B are flowcharts for illustrating the operational procedures of the suction inlet control apparatus of an air conditioner in accordance with the present invention and reference symbol S in the drawings refers to method steps.

First of all, when a power is applied to the air conditioner, the power source means (200) serves to convert the commercial alternating current voltage supplied from the alternating current owner terminal into a predetermined direct current voltage necessary for driving the air conditioner and thereafter outputs same to respective driving circuit and control means (204).

At step S1, the direct current voltage output from the power source means (200) is received by the control means (204) to initialize the air conditioner. At this time, a user may push an operation key with the operation manipulating means (202) to select a warm air cleaning, operation mode of the air conditioner, to set up a room temperature (Ts) as desired and to set an air amount, whereby an operation start signal and other operation selection signals (hereinafter referred to as an operation signal) are sent to the control means (204).

At step S2, the control means (104) discriminates whether a signal for a warm air cleaning operation is input from the operation manipulating means (202). If an operation signal for the warm air cleaning operation is not input to the control means (204) (in case of NO), flow proceeds to step S21 where an operation frequency of the compressor (215) is determined according to the difference between the preset room temperature (Ts) and the detected room temperature (Tr) to carry out a cooling, or a heating operation. Then, flow returns to step S2 and operations subsequent to step S2 are repeated while the air conditioner performs the heating operation.

As a result of the discrimination at step S2, if the air conditioner is set at the warm air cleaning operation mode (in case of YES), flow proceeds to step S3 to determine whether the air conditioner is already operating. If the air conditioner is not already in operation (in case of NO), flow proceeds to step S4 where the control means (204) sends a high level of a control signal through the output terminal P1 to the suction inlet opening, and closing driving means (208) to thereby open the closed suction inlet (3).

Therefore, the high level of the control signal to open the suction inlet (3) is inverted into a low level of the control signal through the inverter IC(209). The direct current voltage (12 V) out of the power source means (200) drives the relay (RY1) to close the contact point (RY1c) thereof.

If the contact point (RY1c) is closed, the alternating current voltage output from the alternating current power terminal(201) is transmitted to the rotor (141a) of the motor (141) to drive the motor in a forward direction and to simultaneously rotate pinions (142). The rotating pinions (142) lower the racks (151) located at the lower ends of both slider members (150).

Figure 10A:
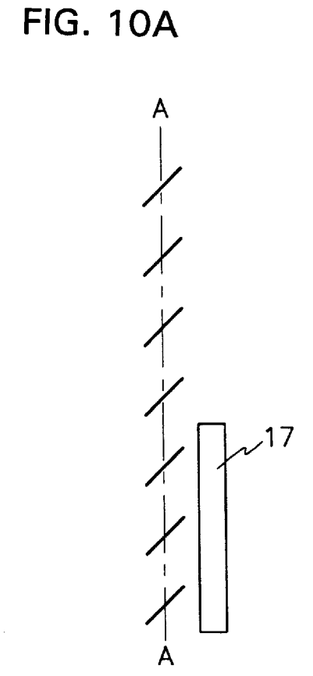
FIG. 10A is a schematic view of air inlet grilles in a fully open state.
Figure 10B:
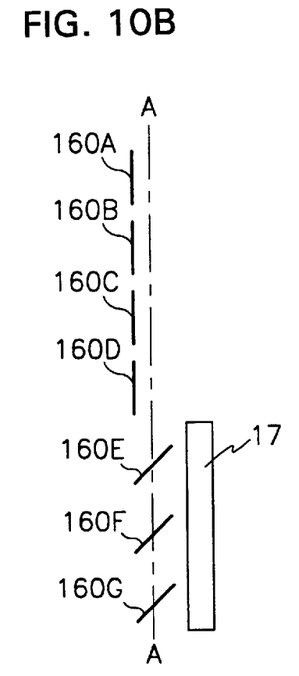
FIG. 10B is a view similar to FIG. 10A with only the grilles located in front of the air cleaner being open.

When the slider members (150) are lowered, the slots holes (152) disposed in the slider members (150) are simultaneously moved downwards to lower the pins (161) of the suction inlet grilles or doors (160), whereby the suction grilles (160) open the suction inlet (3) as they rotate about the holes (122) formed in the guide members (120). Therefore, the suction inlet (3) is opened as shown in FIG. 10(A).

At step S5 the suction inlet opening detecting means (210) detects the lowered position of the slider members (150). The control means (204) receives a signal detected by the suction inlet opening detecting means (210) to determine whether the suction grilles (160) are open. If the suction grilles (160) are not open (in case of NO), flow returns to step S4 to continuously drive the motor (141) until the suction grilles (160) are open.

As a result of the discrimination at step S5, if the suction grilles are open (in case of YES), flow proceeds to step S6 where the suction inlet opening and closing driving means (208) stops the operation of the motor (141) according to the low level of the opening, control signal from the output terminal (P1) of the control means (204).

If the suction grilles (160) are open, flow proceeds to step S7 where the indoor fan motor driving means (218) drives the indoor fan (23) at the predetermined rotation frequency in response to a signal from the control means (204). At step S8, the control means (204) outputs the high level of the control signal through the output terminal (P2) to the suction inlet opening and closing means (208) to properly set the suction inlet (3) for the warm air cleaning operation by closing only the grilles 160A–D that are disposed above the electrical dust collector (17).

Accordingly, the high level of the control signal from the output terminal (P2) is inverted to a low level of the signal by way of the inverter IC (209). The direct current voltage (12 V)) from the power source means (200) drives the relay (RY2) to close the contact point (RY2c) of the relay (RY2).

If the contact point (RY2c) is closed, the alternating current voltage output from the alternating current power terminal(201) is transmitted to the rotor (141b) of the motor (141) to drive the motor and to simultaneously rotate the pinions (142). The rotating pinions (142) raise the racks (151) and the slider members (150).

As the slider membranes (150) rise, the upper grilles (160A–D) begin to close before the lower grilles (160E–G) begin to close, as explained earlier herein.

At step S9, the timer embedded in the control means (204) counts the elapsed time of the operation of the motor (141) and determines whether the elapsed time exceeds a predetermined reference time T1 (i.e., the experimentally collected data for the time period required for closing the upper four grilles (160A–D) is about 5.5 seconds). If the counted elapsed time has not passed the reference time (T1) (in case of NO), flow returns to step S8.

As a result of the discrimination at step S9, if the counted elapsed time has passed the reference time (T1) (in case of YES), it is determined that the upper four suction grilles (160A–D) are closed and the lower three grilles (160E–G) are open. Therefore, flow proceeds to step S10 where the suction inlet opening and closing driving means (208) stops the motor (141) according to the low level of the closing control signal from the output terminal (P2) of the control means (204).

Flow proceeds to step S11 to carry out the warm air cleaning operation mode. At that time, the control means (204) transmits control signals to the dust collector driving means (220) and the heater driving means (212) to respectively energize the electrical dust collector (17) and the electrical heater (27).

Once the dust collector (17) and the heater (27) are energized, flow advances to step S12 where dust contained in the room air sucked through the lower portion of the suction inlet (3) is broken down into fine particles and ionized to have an electrical charge. The ionized dust particles adhere to the dust collecting plate (not shown) having an opposite electrical charge as the odor contained in the room air is simultaneously removed. Then, cleaned air is guided upwards to be discharged through the discharge outlets (7) to warm the room with clean air.

At step S13, the control means (204) determines whether the warm air cleaning operation mode is turned off at the operation manipulating means (202). If the warm air cleaning operation is not to be turned off (in case of NO), flow returns to step S12 to continuously carry out the warm air cleaning operation and repeats the steps subsequent to step S12.

As a result of the discrimination at step S13, if the warm air cleaning operation mode is to be turned off (in case of YES), flow proceeds to step S14 where the control means (204) outputs control signals to dust collector driving means (220) and the heater driving means (212) to de-energize the electrical dust collectors (17) and the electrical heater (27).

Therefore, the dust collector driving means (220) shuts down the power voltage transmitted to the dust collector (17) to turn off the dust collector (17) and the heater driving means (212) stops the electrical heater (27) according to the control of the control means (204).

At step S15, the control means (204) determines whether an operation stop signal has been generated by the user for stopping operation of the air conditioner. If the operation stop signal has been generated with the operation key, flow advances to step S16 where the control means (204) sends a control signal to the indoor fan motor driving means (218) to stop the indoor fan motor (21).

Accordingly, the indoor fan motor driving means (218) stops the operation of the indoor fan motor (21). At step S17, the control means (204) outputs a high level of the control signal through the output terminal (P2) to the suction inlet driving means (208) to completely close the suction inlet (3).

Accordingly, the high level of the control signal from the output terminal (P2) is inverted to a low level of the signal by way of the inverter IC (209). the direct current voltage (12 v) from the power source means (200) drives the relay (RY2) to close the contact point (RY2c) of the relay (RY2).

If the contact point (RY2c) is closed, the alternating current voltage output from the alternating current power terminal(201) is transmitted to the rotor (141b) of the motor (141) to drive the motor in a reverse direction and to simultaneously rotate the pinions (142) to raise the racks (151) and slider members (150).

Figure 10C:
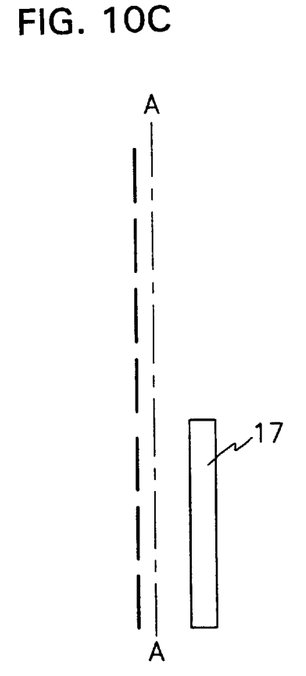
FIG. 10C is a view similar to FIG. 10A with all of the grilles in a closed state.

When the slider members (150) are raised, the suction inlet (3) is closed as shown in FIG. 10(C).

At step S18, the timer embedded in the control means (204) counts the elapsed time to determine whether the elapsed time exceeds the reference time T2 (i.e., the experimentally collected data for the time period for closing all of the suction grilles following a warm air cleaning operation, about 4 seconds). If the counted elapsed time has not passed the predetermined time (T2) (in case of NO), flow returns to step S17 where the motor (141) is continuously driven.

As a result of the discrimination at step S18, if the counted elapsed time has passed the predetermined time (T2) (in case of YES), it is confirmed that all of the suction grilles (160) are closed. Therefore, flow proceeds to step S19 where the suction inlet opening and closing driving means (208) stops the motor (141) according to the low level of the closing control signal from the output terminal (P2) of the control means (204).

Accordingly, at step S20 the control means (204) maintains the air conditioner at the operation stand-by state until an operation signal is again input by the operation manipulating means (202), and operations subsequent to step S2 are repeated.

On the other hand, as a result of the discrimination at step S15, if no operation stop signal for stopping operation has been generated, (in case of NO), flow proceeds to step S30 where the control means (204) outputs a high level of the control signal through the output terminal (PI) to the suction inlet opening and closing means (208) to open the suction inlet.

Therefore, a high level of the opening control signal generated from the output terminal (P1) of the control means (204) is inverted into a low level thereof through the inverter IC (209). The relay (RY1) is driven by the direct current voltage (12V) transmitted from the power source means (200), to thereby close the contact point (RY1c) of the relay (RY1).

If the contact point (RY1c) of the relay (RY1) is closed, the alternating current voltage output from the alternating current power terminal (201) is transmitted to the rotor (141a) of the motor (141) to drive it in a forward direction and to simultaneously rotate the pinions (142) to lower the slider members (150).

When the slider members (150) are lowered the suction inlet (3) is opened as shown in FIG. 10(A).

At step S31, the suction inlet opening detecting means (210) detects the position of the slider members (150) to determine whether the suction grilles (160) are open. If the suction grilles (160) are not open (in case of NO), flow returns to step S30 to continuously drive the motor (141) until the suction grilles (160) are open.

As a result of the discrimination at step S31, if the suction grilles (160) are open (in case of YES), flow proceeds to step S32 where the suction inlet opening and closing driving means (208) stops the motor (141) according to the low level of the opening control signal output from the output terminal (P1) of the control means (204) to thereby complete the opening of the suction grilles (160).

If the suction grilles (160) are open, at step S33 the control means (204) returns to an operation mode prior to the warm air cleaning operation mode, and operations subsequent to step S2 are repeated.

In addition, as a result of the discrimination at step S3, if the previous operation mode is set at the air conditioner (in case of YES), operations subsequent to step S2 are performed.

Therefore, advantages are produced by the suction inlet control apparatus and method of the present invention in that when the electrical dust collector is operated for discharging purified air, the suction inlets which do not communicate with the dust collector are closed to cause all the sucked room air to travel through the electrical dust collector, to thereby improve air cleaning, efficiency of the air conditioner. Also, during a warm air cleaning operation, an electrical heater is activated to heat the cleaned air, thereby preventing cold air from entering the room.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. An air conditioner comprising:
   a housing forming an air inlet for admitting air from a room and an air outlet for discharging the air back into the room;
   an electrical dust collector disposed between the air inlet and air outlet for removing dust from the air;
   a heat exchanger disposed between the dust collector and the air outlet for changing a temperature of the air;
   a fan for sucking air into the air inlet and discharging the air through the air outlet;
   an electrical heater disposed between the electrical dust collector and the air outlet for heating the air;
   a control mechanism for energizing the electric heater when the fan and the electrical dust collector are energized, for heating the cleaned air; and
   a closure mechanism for opening and closing the air inlet, comprising:
      a plurality of vertically adjacent inlet grilles arranged to be moved between open and closed positions, the inlet grilles forming respective air openings when in their open positions, the electrical dust collector arranged to communicate with a first plurality of inlet grilles, and not with a second plurality of inlet grilles, and
      a grill-moving mechanism for opening only the first plurality of inlet grilles when the electrical dust collector is energized.

2. The air conditioner according to claim 1 wherein the first plurality of grilles is disposed below the second plurality.

3. The air conditioner according to claim 1 wherein the electrical heater is disposed between the heat exchanger and the air outlet.

4. An air conditioner comprising:
   a housing forming an air inlet for admitting air from a room and an air outlet for discharging the air back into the room;
   an electrical dust collector disposed between the air inlet and air outlet for removing dust from the air;
   a heat exchanger disposed between the dust collector and the air outlet for changing a temperature of the air;
   a fan for sucking air into the air inlet and discharging the air through the air outlet;
   a closure mechanism for opening an closing the air inlet, comprising a plurality of vertically adjacent inlet grilles arranged to be moved between open and closed positions, the inlet grilles forming respective air openings when in their open positions,
   the electrical dust collector arranged to communicate with a first plurality of inlet grilles, and not with a second plurality of inlet grilles, and
   a grille-moving mechanism for opening only the first plurality of inlet grilles when the electrical dust collector is energized.

5. A method of operating an air conditioner comprising a housing forming an air inlet for admitting air from a room, and an air outlet for discharging the air back into the room; an electrical dust collector disposed between the air inlet and air outlet for removing dust from the air; a heat exchanger disposed between the electrical dust collector and the air outlet for changing a temperature of the air; a fan for sucking air into the air inlet and discharging the air through the air outlet; an electrical heater disposed between the electrical dust collector and the air outlet for heating the air; and a closure mechanism for opening and closing the air inlet, comprising a plurality of vertically adjacent inlet grilles arranged to be moved between open and closed positions, the inlet grilles forming respective air openings when in their open positions, the electrical dust collector arranged to communicate with a first plurality of inlet grilles, and not with a second plurality of inlet grilles; the method comprising the steps of energizing the electrical heater when the fan and the electrical dust collector are energized, for heating the cleaned air, and opening only the first plurality of grilles when the air cleaner is energized.

6. A method of operating an air conditioner comprising a housing forming an air inlet for admitting air from a room, and an air outlet for discharging the air back into the room; an electrical dust collector disposed between the air inlet and air outlet for removing dust from the air; a heat exchanger disposed between the electrical dust collector and the air outlet for changing a temperature of the air; a fan for sucking air into the air inlet and discharging the air through the air outlet; a closure mechanism for opening an closing the air inlet, comprising a plurality of vertically adjacent inlet grilles arranged to be moved between open and closed positions, the grilles forming respective air openings when in their open positions; the electrical dust collector arranged to communicate with a first plurality of inlet grilles, and not with a second plurality of inlet grilles; the method comprising the step of opening only the first plurality of grilles when the air cleaner is energized.

* * * * *